Nov. 21, 1967  L. F. SCOTT  3,353,789

SAFETY JACK FOR AUTOMOTIVE VEHICLES AND THE LIKE

Filed May 2, 1966

INVENTOR
LOUIS F. SCOTT

United States Patent Office 3,353,789
Patented Nov. 21, 1967

3,353,789
SAFETY JACK FOR AUTOMOTIVE VEHICLES AND THE LIKE
Louis F. Scott, R.R. 2, Cedar Springs Camp, Edwards, Mo. 65326
Filed May 2, 1966, Ser. No. 546,668
1 Claim. (Cl. 254—88)

ABSTRACT OF THE DISCLOSURE

This jack is placed on a level surface. The wheel of a vehicle is driven up the inclined ramp of the jack and the wheel is retained in place by a block that is adjustably secured in place and by the end of a rectangular ramp member which end extends above the adjacent flat surface which supports the wheel.

This invention relates to jacks, and more particularly to jacks that support the wheels of an automotive vehicle and the like at a predetermined distance above the ground.

Jacks for supporting automotive vehicles and the like are made in two basic forms, namely, jacks that are vertically adjustable, and jacks that have a fixed height. The vertically adjustable jacks are normally used for changing tires and for placing a vehicle on fixed height jacks for work under the car or the like. While most fixed height jacks, which are sometimes called jack stands, or axle horses, are generally placed under the axle of an automotive vehicle that has already been raised in the usual manner, there are times when one wishes to support the vehicle entirely on its wheels at a predetermined height above the ground. Normally, wheel supported vehicles are far more stable when one has to work under the car or truck, and certainly safer for the person doing the work under the vehicle.

Unfortunately, fixed height jacks adaptable to support the wheels of an automotive vehicle are not commercially available to the average garage owner or car repair mechanic who must resort to make-shift devices that are subject to slippage with resultant damage to the vehicle and possible injury to whoever may be working under the car.

It is therefore the principal object of this invention to provide a safety jack for automotive vehicles and the like that will support the wheel of an automotive vehicle at a fixed distance above the ground.

Another object of this invention is to provide a safety jack for automotive vehicles that does not contain any vertical adjustments.

Another object of this invention is to provide a safety jack that can be put into place under the wheel of a vehicle by having the wheel of the vehicle run up on the jack as will hereinafter be described.

Another object of this invention is to provide a safety jack for automotive vehicles that is horizontally adjustable to receive any diameter wheel of a vehicle.

Still another object of this invention is to provide a safety jack for automotive vehicles and the like that can be mass produced and retailed at a price anyone can afford who may have need for a device of this nature.

Other and further objects and advantages of this invention will come to mind as the reading of the following description of its construction proceeds and the appended drawing is examined.

Figure 1:
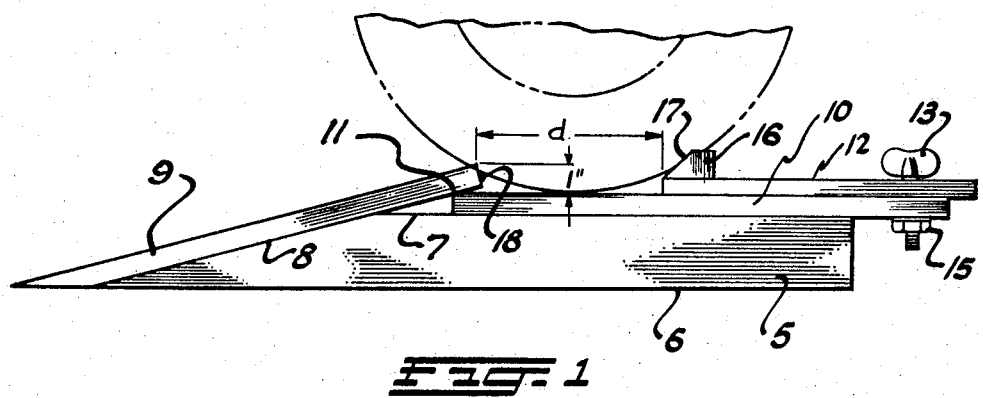
FIG. 1 is a side view of this invention supporting one wheel of a vehicle, the wheel being shown in phantom lines.
Figure 2:
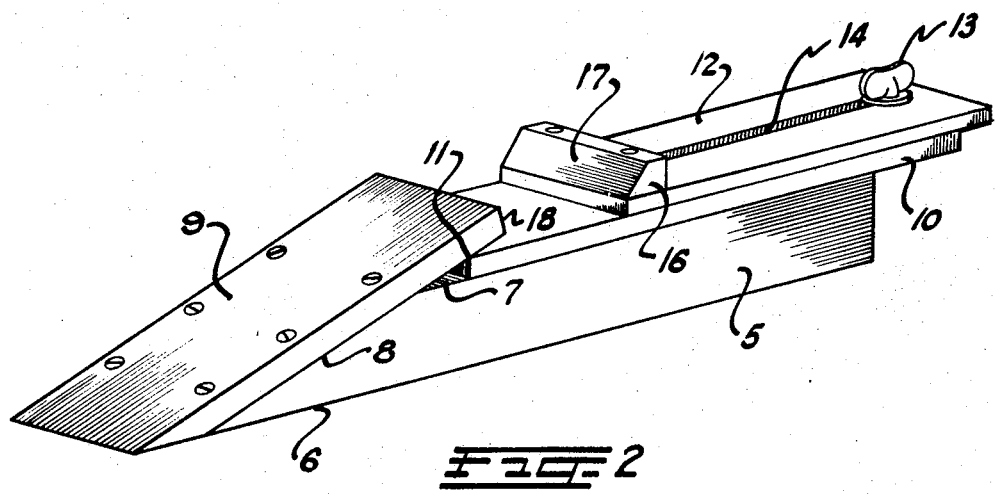
FIG. 2 is a perspective view of this invention.

This invention of a jack having a fixed height, a jack which I personally call a safety jack, consists of a base 5 having a horizontally disposed bottom 6 and a horizontally disposed top 7 that is parallel to the aforesaid bottom 6, and an angularly disposed end 8 to which is secured the ramp 9 by any desired means. Base 5 may be made of spaced members which are parallel to each other. A member 10 that is rectangular in shape is secured in a fixed position to the aforesaid top 7 of the base 5 with one end of the member 10 in contact with the underside of the aforesaid ramp 9 at that point that is indicated in the drawing by the reference number 11. A second rectangular member 12 of the same width as the aforesaid member 10 is secured to, and horizontally adjustable on, the first mentioned rectangular member 10 by means of the thumb screw 13 that passes downward through the elongated opening 14 that is located in the aforesaid second rectangular member 12 through an opening in the outer end of member 10 to pass through the nut 15 that is clearly shown in FIGURE 1 of the drawing. A wheel holding block 16 having a beveled surface 17 is secured to the inward end of the aforesaid member 12. The aforesaid wheel holding block 16 is the same width as that of the often-mentioned member 10 of this invention.

Before one uses this invention of a safety jack, it is necessary for one to measure the horizontal distance "d" of the tire of the vehicle, taking the measurement one inch above the ground as one can understand by looking at FIGURE 1 of the appended drawing. Now, loosen the thumb screw 13 and move the aforesaid member 12 to which the aforesaid wheel holding block 13 is secured, as has been previously stated, horizontally backward or forward to the aforesaid distance "d"; then, firmly tighten the aforesaid thumb screw 13. Now all one has to do is to place this safety jack in front of the wheel of the vehicle and move the vehicle forward, thus running the wheel up on the aforesaid ramp 9 until the wheel drops down into space, the distance may or may not be the one inch shown in FIGURE 1 of the drawing as being between the upper end 18 and the aforesaid beveled surface 17 of the wheel holding block 16. It should be pointed out at this time that this safety jack cannot be adjusted once the wheel of the vehicle has been placed on the same. After the jack is in place, one can now safely work on the underside of the vehicle without any danger whatsoever of the wheel slipping off the jack. A safety jack made according to this specification can be placed under as many wheels of the vehicle as one may desire. This jack can obviously be used on a dirt or gravel surface as well as on any hard surface. This novel invention can be made of wood, steel or any other desired material, and any desired size. The invention is subject to any changes and/or modifications in so long as the changes and/or modifications fall within the scope and intent of the appended claim.

What I now declare as new and desire to secure by Letters Patent is:

A ramp-type wheel jack of the character described, comprising a base having an inclined ramp on one end thereof; a first horizontally disposed member having a wheel engaging surface at the forward end thereof, mounted on the top of said base; a second horizontally disposed member mounted on said first member, the forward end of said second member being spaced rearwardly of said surface, said second member having an upstanding wheel engaging block secured to the forward end thereof; means adjustably mounting said second member on said first member; and said ramp at the end thereof adjacent to and forward of said surface being elevated above said surface, whereby the elevated portion of said ramp and said block confines said wheel on said surface.

References Cited

UNITED STATES PATENTS

| | | | |
|---|---|---|---|
| 1,922,555 | 8/1933 | McCosh | 254—88 |
| 2,321,602 | 6/1943 | Jensen | 254—88 |
| 2,383,661 | 8/1945 | Lopez | 254—88 |

OTHELL M. SIMPSON, *Primary Examiner.*